Figure 1:
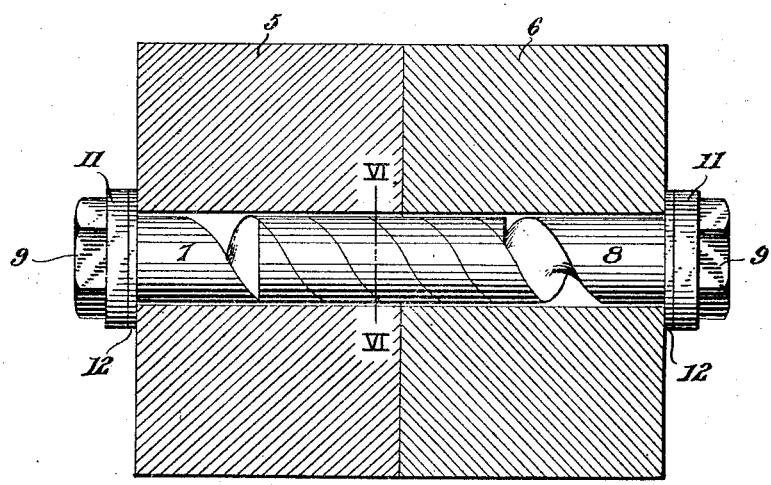

T. C. RESTAK.
BOLT.
APPLICATION FILED DEC. 24, 1921.

1,427,635.

Patented Aug. 29, 1922.

Inventor
T. C. Restak

By F. K. Bryant
Attorney

UNITED STATES PATENT OFFICE.

THOMAS C. RESTAK, OF EAST ROCHESTER, PENNSYLVANIA.

BOLT.

1,427,635.  Specification of Letters Patent.  Patented Aug. 29, 1922.

Application filed December 24, 1921. Serial No. 524,682.

*To all whom it may concern:*

Be it known that I, THOMAS C. RESTAK, a citizen of Jugo-Slavia, residing at East Rochester, in the county of Beaver and State of Pennsylvania, have invented certain new and useful Improvements in Bolts, of which the following is a specification.

This invention relates to certain new and useful improvements in bolts particularly adapted for permanently joining two members such as structural units, iron plates or the like.

The primary object of the present invention is to provide a bolt which, when properly engaged with the members to be bolted together, is permanently locked in bolting position with the locking means inaccessible.

Another object is to provide a bolt of the above kind which shall embody simplicity of construction, durability and effective operation.

Briefly described, the invention consists of a bolt formed in complemental sections each including a headed shank with the shank spirally formed of spaced convolutions so that the shanks of the two sections may be threaded one onto the other with the shanks intertwined, means being provided for automatically locking the shanks against screwing away from each other, which means preferably involves the well known one way clutch structure including balls loosely arranged in a cam recess provided in the shank of one bolt section for engagement with the adjacent surface of the shank of the other bolt section.

With the above general objects in view and others that will appear as the nature of the invention is better understood, the same consists in the novel form, combination and arrangement of parts hereinafter more fully described in connection with the accompanying drawing and in which like reference characters indicate similar parts throughout the views.

Figure 3:
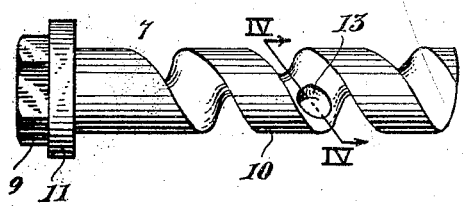
Figure 2:
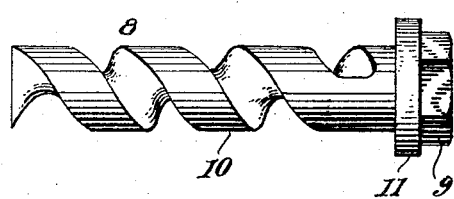
Figure 4:
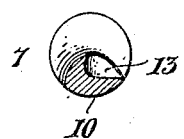
Figure 5:
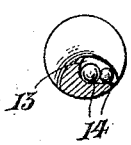
Figure 6:
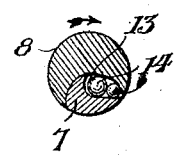

In the drawing,

Figure 1 is a transverse sectional view through two members firmly bolted together by means of a bolt constructed in accordance with the present invention, Figure 2 is a side elevational view of one of the sections of the bolt shown in Figure 1, Figure 3 is a view similar to Figure 2 of the other section of the bolt with the locking balls removed, Figure 4 is a sectional view taken on line IV—IV of Figure 3, and looking in the direction of the arrows, Figure 5 is a view similar to Figure 4 with the locking balls in place, and Figure 6 is a transverse sectional view taken upon line VI—VI of Figure 1.

Referring more in detail to the several views, for purposes of illustration, the present bolt is shown bolting two sheets of iron 5 and 6 together, and the bolt involves a pair of sections 7 and 8 each provided with a head 9 integrally formed on one end of a spiral shank 10 which is twisted with its convolutions in spaced relation so that the shanks may be threaded onto each other with the convolutions intertwined as shown in Figure 1.

The shanks 10 are preferably formed of similar shape and thickness as well as the same diameter so that the outer surfaces of the shanks will lie flush with each other when intertwined as clearly illustrated in Figure 1. The free or inner ends of the shanks are preferably formed at right angles to the longitudinal axes thereof so that the free end of the first convolution of each shank tapers so that the two shanks may be readily engaged for being threaded onto each other. As shown, the inner portions of the heads of the sections may be enlarged in circular form as indicated at 11 so as to have the general effect of the usual washers employed and such washers may be additionally used as indicated at 12 in Figure 1.

The shank of the bolt section 7 is provided with a cam recess 13 in the inner face of one of its convolutions, preferably substantially midway between the ends of the shank, and as seen in Figure 4, this recess is of greatest depth at the axis of the shank and gradually becomes shallower toward the periphery of the shank for a purpose which will presently become apparent.

In operation, one or more spherical members or balls 14 are seated in the recess 13 and are of such diameters as to engage the adjacent face of the shank 10 of the other bolt section 8 when said bolt sections are interengaged, and in addition to this, the recess 13 is disposed obliquely to the longitudinal axis of the bolt sections so that when the two shanks are threaded together, the balls 14 will be naturally moved to the keeper portion of the recess 13 so that the shanks may be threaded freely onto each other but so that they may not be threaded backwardly for separation of the sections. The latter is true because such backward rotation will cause the balls 14 to be rolled outwardly into the shallow portion of the recess so that they will bind between the bottom of the recess and the adjacent surface of the other bolt section shank and thereby effectively lock the two sections against separation.

It will thus be seen that the present invention embodies simplicity and at the same time, the structure is extremely durable and will serve to effectively permanently secure two members together in such manner as to form a desirable substitute for rivets. Also, it is well known that riveting incurs danger and tedious work due to the fact that the rivets must be handled when hot, among other things, while the present device may be quickly placed into operative relation with the members to be bolted without this danger.

From the foregoing description, it is believed that the construction and operation as well as the advantages of the present invention will be readily appreciated and understood by those skilled in the art. Minor changes may be made without departing from the spirit and scope of the invention as claimed.

What is claimed as new is:

1. A bolt of the class described comprising a pair of sections each including a shank formed spirally with the convolutions of the same spaced and having an integral head on one end thereof, said spiral shanks being adapted to be threaded one onto the other with the shanks thereof intertwined and means to automatically lock the shanks in intertwined relation against separating movement.

2. A bolt of the class described comprising a pair of sections each including a shank formed spirally with the convolutions of the same spaced and having an itegral head on one end thereof, said spiral shanks being adapted to be threaded one onto the other with the shanks thereof intertwined and means to automatically lock the shanks in intertwined relation against separating movement, said last named means permitting free threading of the shanks onto each other.

3. A bolt of the class described comprising a pair of sections each including a shank formed spirally with the convolutions of the same spaced and having an integral head on one end thereof, said spiral shanks being adapted to be threaded one onto the other with the shanks thereof intertwined and means to automatically lock the shanks in intertwined relation against separating movement, said last named means comprising a one-way clutch carried by the shank of one of the bolt sections and including a clutch member engageable with the shank of the other bolt section.

4. A bolt of the class described comprising a pair of sections each including a shank formed spirally with the convolutions of the same spaced and having an integral head on one end thereof, said spiral shanks being adapted to be threaded one onto the other with the shanks thereof intertwined and means to automatically lock the shanks in intertwined relation against separating movement, said last named means comprising a one-way clutch carried by the shank of one of the bolt sections and including a clutch member engageable with the shank of the other bolt section, the shank of one bolt section having a recess in the inner surface thereof decreasing in depth toward the periphery of the shank and arranged obliquely to the longitudinal axis of the shank.

5. A bolt of the class described comprising a pair of complemental sections each embodying a shank spirally formed with spaced convolutions and proportioned to permit the threading of one shank onto the other with the shanks intertwined and with the outer surfaces of said shanks flush with each other, the inner surface of the shank of one section being provided with an oblique recess decreasing in depth toward the periphery of the shank and having a free clutch element therein arranged to permit free threading of one shank onto the other but to wedgingly engage the inner surface of the other shank for preventing the latter from being turned off of the first named shank.

In testimony whereof I affix my signature.

THOMAS C. RESTAK.